L. DURGARIAN.
BROILER AND LIKE COOKER.
APPLICATION FILED MAY 31, 1917.
1,244,965.
Patented Oct. 30, 1917.
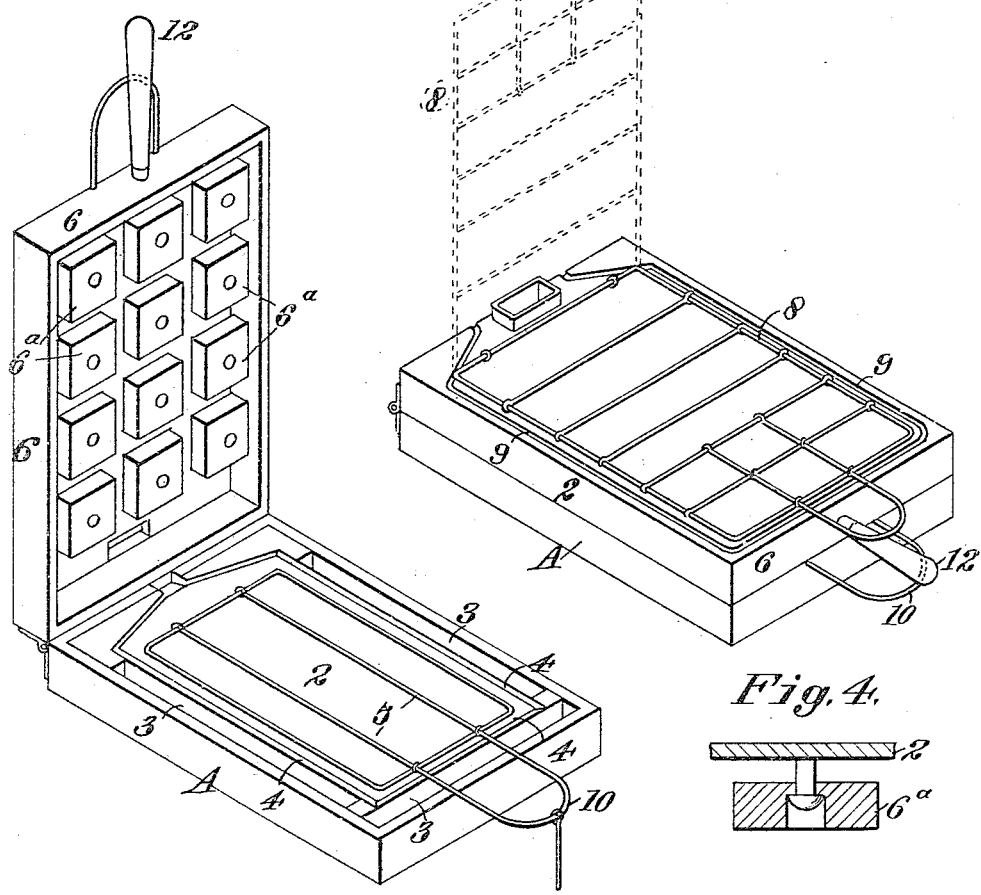
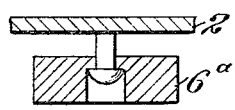
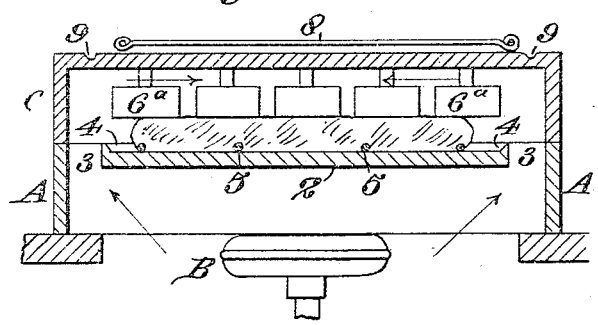
WITNESSES:
Charles Rokles
Julius C. Benesch
INVENTOR
Leo Durgarian
BY Strong & Townsend
ATTORNEYS

UNITED STATES PATENT OFFICE.

LEO DURGARIAN, OF SAN FRANCISCO, CALIFORNIA.

BROILER AND LIKE COOKER.

1,244,965.  Specification of Letters Patent.  Patented Oct. 30, 1917.

Application filed May 31, 1917. Serial No. 171,905.

*To all whom it may concern:*

Be it known that I, LEO DURGARIAN, a subject of the Sultan of Turkey, residing at the city and county of San Francisco and State of California, have invented new and useful Improvements in Broilers and like Cookers, of which the following is a specification.

My invention relates to an implement which is designed especially for broiling and cooking meats and which may also be used for toasting and other like cooking purposes.

It consists of a pair of superposed hinged box-like structures, beneath which the heat of a suitable burner is applied and allowed to pass up around and between the two structures, and in conjunction therewith an intermediate gridiron fitting the lower structure and a series of independent, oscillating blocks carried in the upper structure and adapted to adjust themselves to the upper surface of the meat being cooked after the upper structure has been closed down upon the lower structure, the surface of the upper structure serving for other cooking purposes.

It also comprises details of construction which will be more fully explained by reference to the accompanying drawings, in which—

Figure 1 is a perspective view of the device in closed position.

Fig. 2 is a perspective view with the upper part open.

Fig. 3 is a transverse section of the device showing a burner beneath.

Fig. 4 is a section showing one of the independently movable blocks.

As shown in the drawings, A is a box-like structure open at the lower side and beneath it is located a burner or burners B which may be of any suitable or desired character to supply the necessary heat. 2 is a tray which may be supported in the upper part of the structure A, and this part A has spaces around its sides, as shown at 3, for the passage of heat into the upper part of the apparatus. This tray 2 has grooves 4 formed lengthwise in its surface by raised peripheral edges and a gridiron-like frame 5 is adapted to fit substantially in the line of these grooves. Upon this gridiron a steak or other meat to be cooked is placed and the upper structure 6, which is hinged above the structure A, may be closed down over the steak, thus inclosing the heat which is derived from the burner.

Within this structure 6, which is open at its lower side, are fitted a number of loosely supported blocks 6ª, the lower surfaces of which are flat and adapted to rest upon the surface of the meat being cooked. These blocks have a loose universal movement upon the stems by which they are supported, and thus the lower faces will adjust themselves to the irregularities of the meat surface below.

The heat arising through the spaces around this tray 2 will serve to heat the upper surface of the steak and also the blocks 6ª sufficiently to cook the steak simultaneously upon both sides, the one subjected to the direct heat of the burner and the heat of the blocks from above, so that it will not be necessary to turn the steak to have it cooked entirely and at one single operation which will save a great deal of time in large establishments where a great deal of cooking is being done.

The upper part 6 of the box forms a surface upon which ham, bacon, hot cakes, toast, or any substance of a like nature can be cooked by the heat passing into this structure from below. A grating 8 is preferably hinged to this box and serves to hold the article being cooked upon it in place so that it will not slide off if the apparatus be opened or tilted. Channels or grooves 9 are formed in this upper surface so that any juice which is expressed from the meat being cooked, can be collected and diverted to a suitable point where it may be received. In the lower broiler section like grooves 4 will collect the juice of the steak being broiled which may also be collected at any suitable point.

A handle 10 extends out from the broiler 2 through suitable openings or grooves made between the upper and lower structures and a similar handle or opening extends from the frame or grid on the upper structure. By means of a handle 12, connected with the upper structure, it can be turned back exposing the interior of the part A for the removal of the steak which is released from the gridiron by lifting the handle 10. In a like manner the handle of the gridiron upon the upper structure may be raised to release the articles being cooked thereon.

The device forms an extremely convenient arrangement for either small or large cooking operations and will be found very economical.

Having thus described my invention, what I claim and desire to secure by Letters Patent is—

1. A cooking utensil comprising superposed structures hinged together capable of being separated about the hinges, the lower structure being open at the bottom to receive a source of heat, a gridiron or meat support within the lower structure, and a series of independently movable blocks carried by the upper structure and capable of adapting themselves to the surface of the meat being cooked.

2. In a broiler and like device, a pair of superposed open bottomed box-like structures, heating means located beneath the lower structure, a channeled pan supported within the upper part of the lower box having an open passage around its periphery, and a gridiron, the bars of which fit the channels of said pan and are adapted to support an article to be cooked, said upper structure being closable above the lower one to confine the heat between the two and independently tiltable blocks suspended from said upper member.

3. A cooking device comprising a pair of open bottomed boxes hinged together at one end, heating means located beneath the lower box, a pan supported within the lower structure and having heat passages around its periphery, a broiler gridiron frame carried upon the upper surface of the pan, and independently supported blocks depending from the top of the upper pan and adapted to adjust themselves upon the top of the article to be cooked when the structures are closed together.

4. A cooking apparatus including open bottomed superposed members, a pan with a surrounding heat channel within the lower member and a source of heat below, gridiron bars supported upon the pan, stems depending from the upper member and self-adjusting blocks carried thereby and adapted to rest upon the article being cooked, a cooking surface on the upper member, a hinged frame closable upon articles upon the top of the upper member, and handles for the frame and gridiron.

In testimony whereof I have hereunto set my hand in the presence of two subscribing witnesses.

LEO DURGARIAN.

Witnesses:
JOHN H. HERRING,
W. W. HEALEY.

Copies of this patent may be obtained for five cents each, by addressing the "Commissioner of Patents, Washington, D. C."